(12) United States Patent
Biere et al.

(10) Patent No.: US 8,339,259 B1
(45) Date of Patent: Dec. 25, 2012

(54) SYSTEM AND METHOD FOR SETTING AN ALARM BY A THIRD PARTY

(75) Inventors: Devon L. Biere, Olathe, KS (US); Jeff Dillon, Huntington Beach, CA (US); Michael A. Gailloux, Overland Park, KS (US); Kenneth Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 862 days.

(21) Appl. No.: 12/485,239

(22) Filed: Jun. 16, 2009

(51) Int. Cl.
*G05B 23/00* (2006.01)
*B08B 5/00* (2006.01)
*G08B 1/08* (2006.01)

(52) U.S. Cl. ............. 340/539.12; 340/539.11; 340/5.24; 340/309.7; 340/309.16; 340/5.2

(58) Field of Classification Search .................. None
See application file for complete search history.

(56) References Cited

U.S. PATENT DOCUMENTS

| | | | |
|---|---|---|---|
| 6,542,077 B2 * | 4/2003 | Joao ........................ | 340/426.16 |
| 7,312,712 B1 * | 12/2007 | Worrall .................... | 340/573.4 |
| 7,956,727 B2 * | 6/2011 | Loncar ..................... | 340/309.16 |
| 2005/0055242 A1 * | 3/2005 | Bello et al. ............... | 705/2 |
| 2005/0283368 A1 * | 12/2005 | Leung ...................... | 704/270 |
| 2009/0203349 A1 * | 8/2009 | Hollstien .................. | 455/404.1 |
| 2010/0001875 A1 * | 1/2010 | Wang et al. ............... | 340/691.6 |
| 2010/0122334 A1 * | 5/2010 | Stanzione et al. .......... | 726/11 |
| 2010/0283601 A1 * | 11/2010 | Tai et al. ................... | 340/539.12 |
| 2011/0148606 A1 * | 6/2011 | Glee et al. ................. | 340/309.7 |
| 2011/0183643 A1 * | 7/2011 | Martin et al. ............. | 455/404.1 |

* cited by examiner

*Primary Examiner* — Julie Lieu (57) ABSTRACT

An alarm device is provided. The alarm device comprises a processor, an alerting component, a communication interface, and an alarm application. The communication interface receives messages encapsulating an alarm control message from a third party. The alarm application, when executed by the processor, receives the message from the communication interface, validates the message based on a code embedded in the message, parses a body of the message to extract the encapsulated alarm control message, schedules an alarm event based on the body of the message, and activates the alerting component when the alarm event occurs.

20 Claims, 7 Drawing Sheets

SYSTEM AND METHOD FOR SETTING AN ALARM BY A THIRD PARTY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communications networks have grown to provide nearly ubiquitous communication coverage throughout the United States. The technology for linking into the wireless communications network, for example a radio transceiver operable to communicate in accordance with one of the several built-out wireless communication technologies, has become relatively inexpensive and may be built into a variety of electronic devices in addition to the customary mobile phone or cell phone. Wireless communication networks increasingly support a variety of data communications including short messaging service (SMS and/or text messaging), electronic mail, and other data communications.

SUMMARY

In an embodiment, an alarm device is disclosed. The alarm device comprises a processor, an alerting component, a communication interface, and an alarm application. The communication interface receives messages encapsulating an alarm control message from a third party. The alarm application, when executed by the processor, receives the message from the communication interface, validates the message based on a code embedded in the message, parses a body of the message to extract the encapsulated alarm control message, schedules an alarm event based on the body of the message, and activates the alerting component when the alarm event occurs.

In another embodiment, a computer based method of setting an alarm by a third party is disclosed. The method comprises a computer receiving input defining an alarm event, formatting a message comprising a subject and a body, and transmitting the message to a first alarm device. The body encapsulates information about the alarm event. The first alarm device is adapted to generate an alert at a time based on the message.

In another embodiment, a computer program product is disclosed. The computer program product comprises a computer usable medium having a computer readable program code embodied therein, the computer readable program code adapted to be executed to implement a method for setting an alarm by a third party. The method comprises providing a system, wherein the system comprises distinct software modules, and wherein the distinct software modules comprise a messaging module, a user interface module, and an alarm composition module. The method further comprises presenting a plurality of alarm composition controls to a display screen by the user interface module and receiving alarm composition inputs from an input device by the user interface module. The method further comprises formatting a message subject comprising an authentication code by the alarm composition module and formatting a message body based on the alarm composition inputs by the alarm composition module. The method further comprises providing the message subject and the message body to the text messaging module and the messaging module transmitting the message based on the message body and the message subject.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method for a third party setting an alarm are taught by the present disclosure. Some people work in jobs that have a dynamic schedule. Restaurant or food service workers, healthcare workers, law enforcement workers, construction workers, communication services workers, emergency response workers, and other workers may have work schedules that change after the worker has left the work location on one day and before the worker returns to work the next day. For example, when a nurse leaves work on Wednesday, he/she may be scheduled to report for work Thursday at 6 AM at Hospital X for ward duty. At 4 AM Thursday, however, when making up nurse schedules for the day, a head nurse may reschedule the nurse to report for work Thursday at 11 AM at Hospital Y for Emergency Room duty. The present disclosure teaches a system for the head nurse to use to remotely set an alarm of the subject nurse so their alarm does not wake them at 4:30 AM. Instead, the alarm of the subject nurse may be reset to 6 AM, giving the subject nurse an additional 90 minutes of sleep. The system may provide a message that may be presented to the subject nurse indicating that his/her schedule changed and indicating the revised schedule. In resetting the alarm, the system may take into account expected commute times of the worker, minimum home preparation times, and latest wake-up times. In the scenario above, for example, the subject nurse could have slept in later and still had ample time to report to work by 11 AM, but perhaps the subject nurse prefers to wake no later than 6 AM during the week because they have school-age children who need to be readied for the school day.

An alarm may take many forms. In an embodiment, an alarm is effective to awaken a sleeping individual, for example by emitting an audio alert of a sufficient amplitude to be effective to awaken the individual from a sound sleeping state. Another alarm form may include vibrating so as to awaken a sleeping individual, for example when the alarm device is secured in a pocket of the sleeping individual or under the pillow of the sleeping individual.

Figure 1:
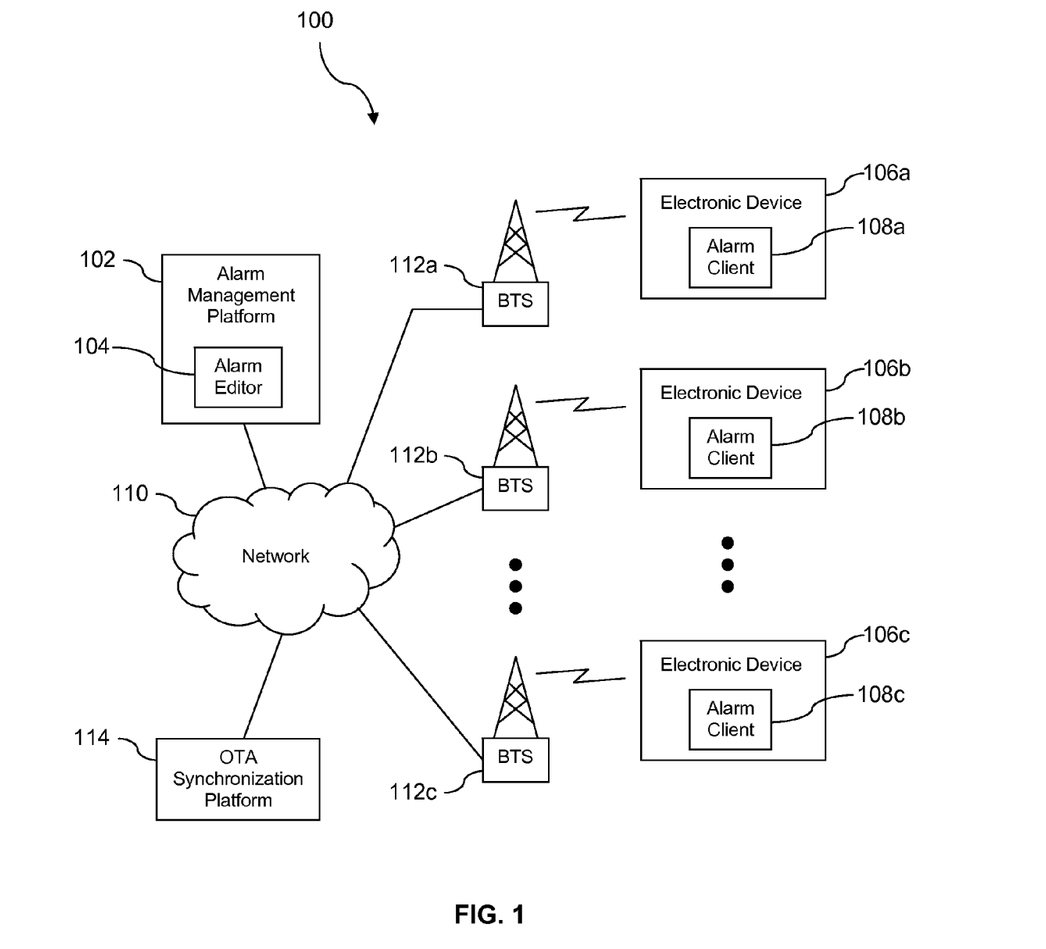
FIG. 1 is an illustration of a system according to an embodiment of the disclosure.

Turning now to FIG. 1, a system 100 for setting an alarm by a third party is described. The system 100 comprises an alarm management platform 102, an alarm editor 104 application that is hosted by the alarm management platform 102, and a plurality of electronic devices 106 that each host an alarm client 108 application. The alarm management platform 102 communicates with the electronic devices 106 via a communication network 110 and a plurality of base transceiver stations (BTSs) 112. For example, the alarm management platform 102 may communicate through the network 110 to a first base transceiver station 112a and via the first base transceiver station 112a to a first electronic device 106a having a first alarm client 108a. Likewise, the alarm management platform 102 may communicate through the network 110 to a second base transceiver station 112b and a second electronic device 106b having a second alarm client 108b and to a third base transceiver station 112c and a third electronic device 106c having a third alarm client 108c.

It is understood that the system 100 may comprise any number of base transceiver stations 112 and any number of electronic devices 106. It is understood that in some scenarios, two or more of the electronic devices 106 may be served by a single base transceiver station 112, for example when the electronic devices 106 may be located within the same coverage area of a single base transceiver station 112. While the electronic devices 106 are illustrated in FIG. 1 communicating with the network 110 via a wireless link to the base transceiver stations 112, the teachings of the present disclosure may be applied equally to electronic devices 106 that communicate with the network 110 via different communication paths. For example, in an embodiment, one or more of the electronic devices 106 may be coupled to the network 110 by a wired communication link. Alternatively, in an embodiment, a wireless access device (not shown) may establish a wireless communication link with the base transceiver station 112 and the wireless access device may establish a wired communication link with the electronic device 106, whereby the electronic device 106 is communicatively coupled to the network 110.

The electronic device 106 may be a mobile phone, a personal digital assistant (PDA), a media player, a laptop computer, a tablet computer, an alarm clock, or other electronic device with communication connectivity and alarming capability. An embodiment of a mobile phone handset is described in more detail hereinafter. The alarm management platform 102 may be a computer or computer system that has been loaded with the alarm editor 104 application and/or computer program. Computers are discussed in more detail hereinafter. In an embodiment, the alarm management platform 102 may support other functionality and execute other applications not associated with the alarm setting and/or resetting functionality taught by the present disclosure. In an embodiment, the alarm management platform 102 may promote only alarm setting functionality or only alarm resetting functionality. Resetting an alarm may comprise turning the alarm off. The functionality to set the alarm and/or to reset the alarm may be referred to in some contexts as changing the alarm or an alarm changing functionality. When executed by the alarm management platform 102, the alarm editor 104 provides functionality to a third party for setting alarms associated with the electronic devices 106. The third party may be a manager, a shift supervisor, or other person responsible for scheduling of people and/or workers to a location. The alarm editor 104 may provide a graphical user interface (GUI) or other user interface to compose alarm messages for transmitting to the electronic devices 106. When the alarm messages are received by the alarm client 108 on the electronic devices 106, the alarm client 108 may parse the alarm message and set and/or reset an alarm function of the electronic device 106 accordingly. In some contexts, the alarm message may be referred to as an alarm control message.

The GUI of the alarm editor 104 may promote identifying one or more of the electronic devices 106 for receiving the alarm message, for example by entering a worker name which is associated by the alarm editor 104 to the appropriate electronic device 106. For example, the alarm editor 104 may maintain a configuration file that associates a worker name with a mobile phone number of the worker, a phone number of an alarm clock device of the worker, an Internet Protocol (IP) address of an alarm clock device of the worker, or another address of an alarm clock device of the worker. The alarm editor 104 may provide a capability for defining and modifying the configuration file associating worker names to the electronic devices 106. Alternatively, the alarm editor 104 may promote entering the phone number or electronic address associated with the electronic devices 106 directly, for example by a manager directly entering a phone number of a mobile phone of a subordinate worker into the GUI of the alarm editor 104.

The GUI of the alarm editor 104 may promote defining a work schedule, for example by identifying at least one of a reporting date and time, a reporting location, and/or a reporting duty assignment. The GUI of the alarm editor 104 may provide drop down menus to select reporting date, reporting time, reporting locations, and duty assignments. Alternatively, the GUI of the alarm editor 104 may permit at least some of the information to be entered as free form text entry, for example using input text field windows. The GUI of the alarm editor 104 may promote defining an alarm time by using a drop down menu to select dates and times or by using free form text entry into text field windows. Alternatively, the alarm editor 104 may automatically determine the alarm time associated with the work schedule.

The alarm editor 104 may determine an alarm time based on information configured for the subject worker, for example based on a home preparation time and a projected commute time of the subject worker. For example, a commute time may be configured for the subject worker. A first worker may live 5 miles from the one or more work locations and have a commute time that typically does not exceed 15 minutes. A second worker may live 12 miles or more from the one or more work locations and have a commute time that ranges from 15 minutes to 30 minutes. The commute times associated with each of the workers may be parameterized by time of day. The commute times associated with each of the workers may be parameterized by work location. Similarly, a home preparation time may be configured for the subject worker. The first worker may be able to ready themselves for beginning their commute within 30 minutes of awakening; the second worker may need 75 minutes to ready themselves for beginning their commute after awakening. The alarm editor 104 may promote entering and updating projected commute times and home preparation times for the workers associated with the electronic device 106.

In determining the alarm time, the alarm editor 104 may further take into consideration alarm time thresholds that may be configured for each of the electronic devices 106. For example, the first worker may prefer to awaken no later than 6 AM, due to personal preferences or due to schedules of school age children the first worker is responsible for getting ready for school. The second worker may prefer to awaken no later than 9 AM, due to a personal preference not to waste time oversleeping. A third worker may identify no alarm time threshold. Thus, if the alarm editor 104 determines that the alarm time that comports with the subject worker's projected commute time and the home preparation time is later than the alarm time threshold associated with the subject worker, the alarm editor 104 may determine the alarm time to be the alarm time threshold. Otherwise, the alarm editor 104 determines the alarm time based on the subject worker's projected commute time and home preparation time.

The alarm editor 104 may transmit the alarm time and the work schedule to the electronic device 106, for example by the alarm management platform 102 sending an electronic message to the electronic device 106 via the network 110 and the base transceiver station 112. The electronic message may comprise the alarm time and the work schedule information, for example the reporting date and time, the reporting location, and the duty assignment. A variety of electronic messaging formats using a variety of electronic communication technologies and/or communication protocols are contemplated by the present disclosure. In an embodiment, the electronic messaging format may be a text message. In another embodiment, the electronic messaging format may be an email message. In another embodiment, a different electronic messaging format may be employed.

In an embodiment, the electronic device 106 and the alarm client 108 may provide an interface to set and or reset the alarm time. In an embodiment, the alarm client 108 may have the authority to veto an alarm time change initiated by the alarm management platform 102. In an embodiment, a computer system (not shown) located at the home of the user of the electronic device 106 may execute an application similar to the alarm editor 104, where the home version is limited to making modifications to the associated alarm of the associated electronic device 106. For example, the boss of the user may phone or email a change of schedule to the user, and the user may employ the home version of the alarm editor 104 to push a changed alarm to the subject electronic device 106. In an embodiment, the home computer system (not shown) may receive the messages from the alarm management platform 102 and select to change the alarm setting of the electronic device 106, for example by communicating with the alarm client 108, or may reject the message and leave the alarm setting of the electronic device 106 unchanged. The home computer system may employ rules to determine when to accept and when to reject messages to change the alarm setting of the electronic device 106.

Figure 2A:
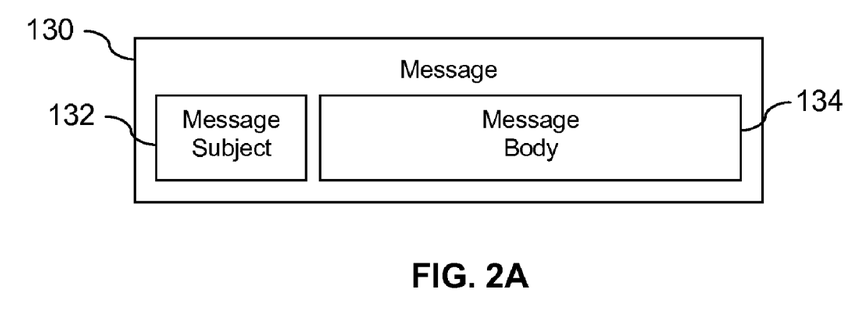
FIG. 2A and FIG. 2B illustrate an electronic message format according to an embodiment of the disclosure.
Figure 2B:
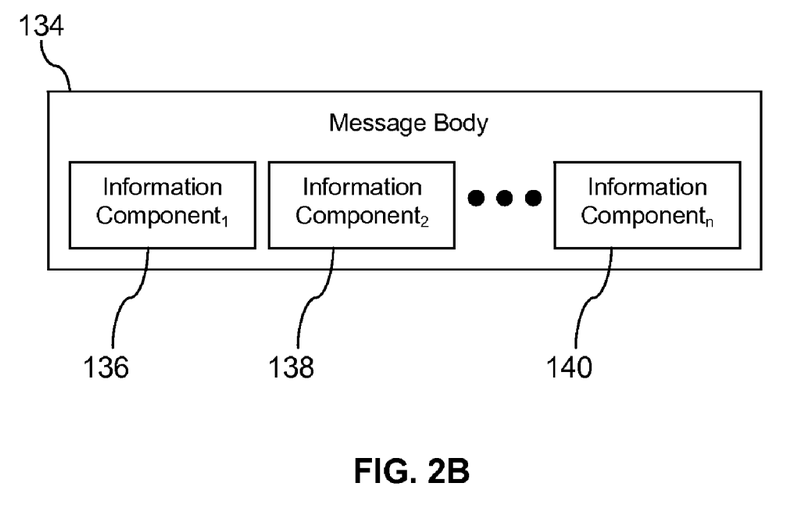

Turning now to FIG. 2A and FIG. 2B, an electronic message 130 is described. In an embodiment, the electronic message 130 comprises a message subject 132 and a message body 134. While shown in FIG. 2A as the message subject 132 preceding the message body 134, in another embodiment, the message 130 may be formatted with the message body 134 preceding the message subject 132. In an embodiment, the message subject 132 may be encapsulated within a message header. In an embodiment, the message 130 may comprise a short message service (SMS) electronic message or text message. In another embodiment, the message 130 may comprise an electronic mail (email) message. In other embodiments, the message 130 may be conveyed as some other kind of electronic message.

In an embodiment, the message subject 132 comprises a code or keyword that identifies the message 130 to the electronic device 106 and/or the alarm client 108 as an alarm control message. In some contexts, the code may be referred to as an alarm code, as an authentication code, or as an alarm authentication code. In an embodiment, a communication application of the electronic device 106 may identify the message 130 as an alarm command message based on parsing the message subject 132 and forward or hand-off the message 130 to the alarm client 108 for further processing. The code or keyword in the message subject 132 may promote the electronic device 106 and/or the alarm client 108 authenticating the message 130 before setting and/or revising an alarm setting of the electronic device 106. For example, the alarm client 108 may reject a spurious message 130 generated by a co-worker to play a practical joke on the subject worker by setting the alarm of the electronic device 106 to awaken the subject worker several hours early and direct the subject worker to report to the wrong work location or several hours ahead of their actually scheduled reporting time, when the message subject 132 does not contain an appropriate code or keyword. In an embodiment, each of the electronic devices 106 may be associated with a separate code or keyword. In another embodiment, however, the code or keyword may be the same for each of the electronic devices 106.

The message body 134 may comprise a plurality of information components. For example, the message body 134 may comprise a first information component 136, a second information component 138, and a third information component 140, where the third information component 140 is the last in an indefinite number of n information components 140. The information components 136, 138, 140 may comprise an information identifier and an information content. For example, the first information component 136 may comprise an alarm time-date information identifier and a 7:24:2010:: 15:10:00 information content, corresponding to a Jul. 24, 2010 3:10 PM alarm time. It is understood that the present disclosure contemplates that any format for representing alarm time-date information may be employed, including a number of seconds after a conventional start date such as is known in the Unix operating system. Additionally, the present disclosure contemplates that the presentation of date and time information, for example by the GUI of the alarm editor 104 and by a GUI or other user interface of the alarm client 108, may be distinguished from the underlying representation of the date and time in the information content of the information component 136, 138, 140.

The information component 136, 138, 140 may comprise other information identifiers such as reporting location, duty assignment, supervisor, number of peer workers, number of subordinates, and other information identifiers. The information content may provide appropriate information on the associated information identifiers. For example, the reporting location information identifier may be followed by a location, for example Hospital Y.

The duty assignment information identifier may be followed by an assignment, for example emergency room support. The number of peer workers information identifier may be followed by a number, for example 3. In an embodiment, one of the information components 136, 138, 140 may comprise an on-off state of the alarm functionality provided by the alarm client 108. For example, if the information component indicates an off state, the alarm of the electronic device 106 may not be activated. The information components 136, 138, 140 may also comprise information about the message 130—for example, when the message was authored, when the message was transmitted by the alarm management platform 102, the identity of the alarm management platform 102 or of the individual using the alarm editor 104 (for example the individual logged in to use the alarm editor 104, which also may be referred to as the alarm message author), and other information. The present disclosure contemplates other types of information identifier and other types of corresponding information that may be conveyed via the electronic message 130 in the message body 134. In some contexts, the message body 134 may be said to encapsulate an alarm control message.

With reference again to FIG. 1, the electronic devices 106 may be any of a variety of devices that may be used to present an alarm or an alert to a worker to awaken. The electronic devices 106 may be any of a mobile phone, an alarm clock having network connectivity (either wired or wireless connectivity), a media player, a gaming platform, a set-top box, a television, a wrist watch, and other like electronic devices. A handset implementation of the electronic devices 106 is discussed in further detail hereinafter, but it is understood that the disclosure is not limited to a handset based implementation. Alternatively, some implementations of the electronic devices 106 may be similar to a computer system that is programmed with or loaded with the alarm client 108 application. For example, in an embodiment, the electronic device 106 may be a laptop computer, a tablet computer, and other devices.

When the alarm client 108 receives the electronic message 130, the alarm client 108 may parse the electronic message 130 and set and/or reset an alarming function of the electronic device 106. Additionally, when the alarm activates, the alarm client 108 may present at least some of the information contained in the message body 134, for example on a display of the electronic device 106 or via an audio message through speakers of the electronic device 106. For example, the alarm client 108 may present the reporting time, the reporting location, and the duty assignment. Alternatively, the worker and/or user of the electronic device 106 may invoke the GUI or user interface provided by the alarm client 108 and select presentation of one or more of the information components of the message body 134.

In an embodiment, the system 100 further comprises an over-the-air (OTA) synchronization platform 114. The over-the-air synchronization platform 114 may receive requests from the alarm management platform 102, initiated by the alarm editor 104, to configure the alarm clients 108 to respond to a changed code. To promote security, the alarm editor 104 may promote occasionally and/or periodically changing the code that is embedded in the message subject 132 and which triggers the alarm client 108 to respond to the electronic message 130. The alarm editor 104 may send the request to change the code to the over-the-air synchronization platform 114, identifying the electronic devices 106 and identifying the new code. Thereafter, the over-the-air synchronization platform 114 may take care of the details such as repeatedly contacting the electronic devices 106, as need may be, to establish a communication link and complete the re-provisioning of the electronic device 106 and/or the alarm client 108 with the changed code. For example, if the first electronic device 106a is temporarily out of coverage or is temporarily turned off, the over-the-air synchronization platform 114 may periodically attempt to connect to the first electronic device 106a to complete the re-provisioning. In an embodiment, the over-the-air synchronization platform 114 may report back to the alarm editor 104 and/or the alarm management platform 102 when one or more of the electronic devices 106 cannot be contacted and re-provisioned, for example after a defined time-out interval. In an embodiment, the over-the-air synchronization platform 114 may provide other over-the-air programming and/or provisioning functionality to the electronic devices 106 not associated with the alarm setting/resetting functionality taught by the present disclosure.

In an embodiment, the over-the-air synchronization platform 114 may promote concealing at least some of the private and/or confidential information associated with the electronic device 106 from the alarm management platform 102. For example, the alarm management platform 102 may send a message via the over-the-air synchronization platform 114 addressing the electronic device 106 using a logical reference rather than using a private and/or confidential reference, such as an internet protocol address, a mobile phone number, or other reference, and the over-the-air synchronization platform 114 may map the logical reference to the private and/or confidential reference to complete routing the message to the electronic device 106.

Figure 3:
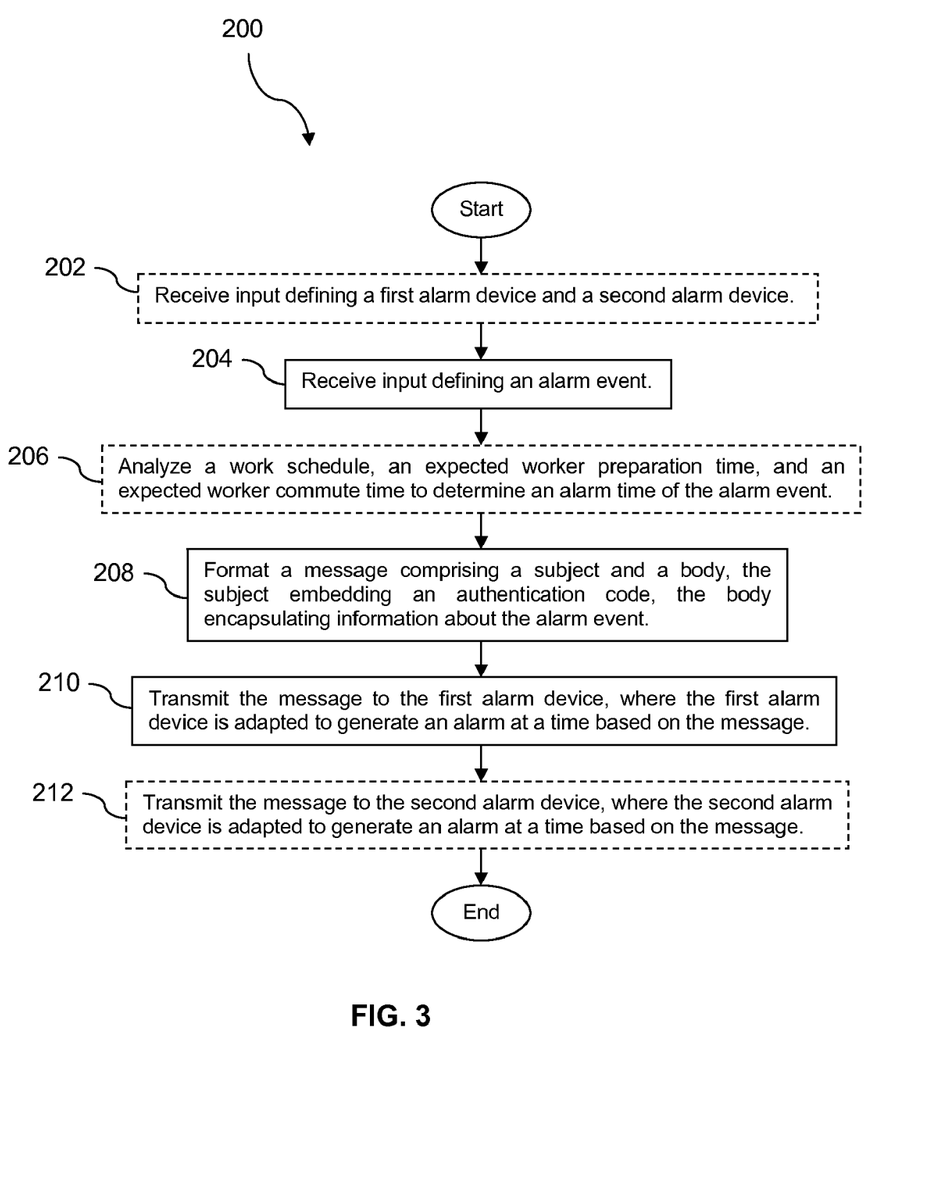
FIG. 3 is a flow chart of a method according an embodiment of the disclosure.

Turning now to FIG. 3, a method 200 is described. At block 202, input may be received defining a first alarm device and a second alarm device, for example the first electronic device 106a and the second alarm device 106b. The first and second alarm devices each may be associated with a user and/or a worker and with a unique phone number and/or address. In an embodiment, the information and associations among the information may be stored in a database or a file.

At block 204, input is received defining an alarm event. For example, input may define at least one of a work schedule, a reporting location, a duty assignment, and other related information. At block 206, the work schedule, an expected worker preparation time, and an expected worker commute time may be analyzed to determine an alarm time of the alarm event. At block 208, a message is formatted comprising a subject and a body, the subject embedding an authentication code or keyword and the body encapsulating information about the alarm event. In an embodiment, the message may be implemented as the electronic message 130 described above. The information about the alarm event may comprise the alarm time, the reporting location, and/or the duty assignment described with reference to block 204 and block 206.

At block 210, the message is transmitted to the first alarm device, for example to the first electronic device 106a. The first alarm device is adopted to generate an alarm at a time designated by or based on the message. At block 212, optionally, the message may be transmitted to the second alarm device, for example to the second electronic device 106b. The second alarm device, likewise, is adopted to generate an alarm at the time designated by or based on the message. Note that method 200 comports with generating and sending electronic messages 130 individually to electronic devices 106 or, when circumstances are suitable, sending the same electronic message 130 to two or more electronic devices 106, for example when the two or more electronic devices share the same work schedule and/or reporting information. For example, when a shift of workers, such as restaurant staff, are being scheduled, two or more of the electronic devices 106 may suitably receive substantially the same electronic message 130. In an embodiment, a plurality of electronic devices 106 may be designated by a group name, and the alarm editor 104 may map the group name to the plurality of separate electronic devices 106 and automatically create and send appropriate electronic messages 130 to each of the electronic devices 106. The steps of the method 200 may be said to comprise the alarm management platform 102 scheduling and/or setting an alarm event. In an embodiment, the steps of method 200 also may be employed, with only minor modification, to turn off and/or reset an alarm event.

Figure 4:
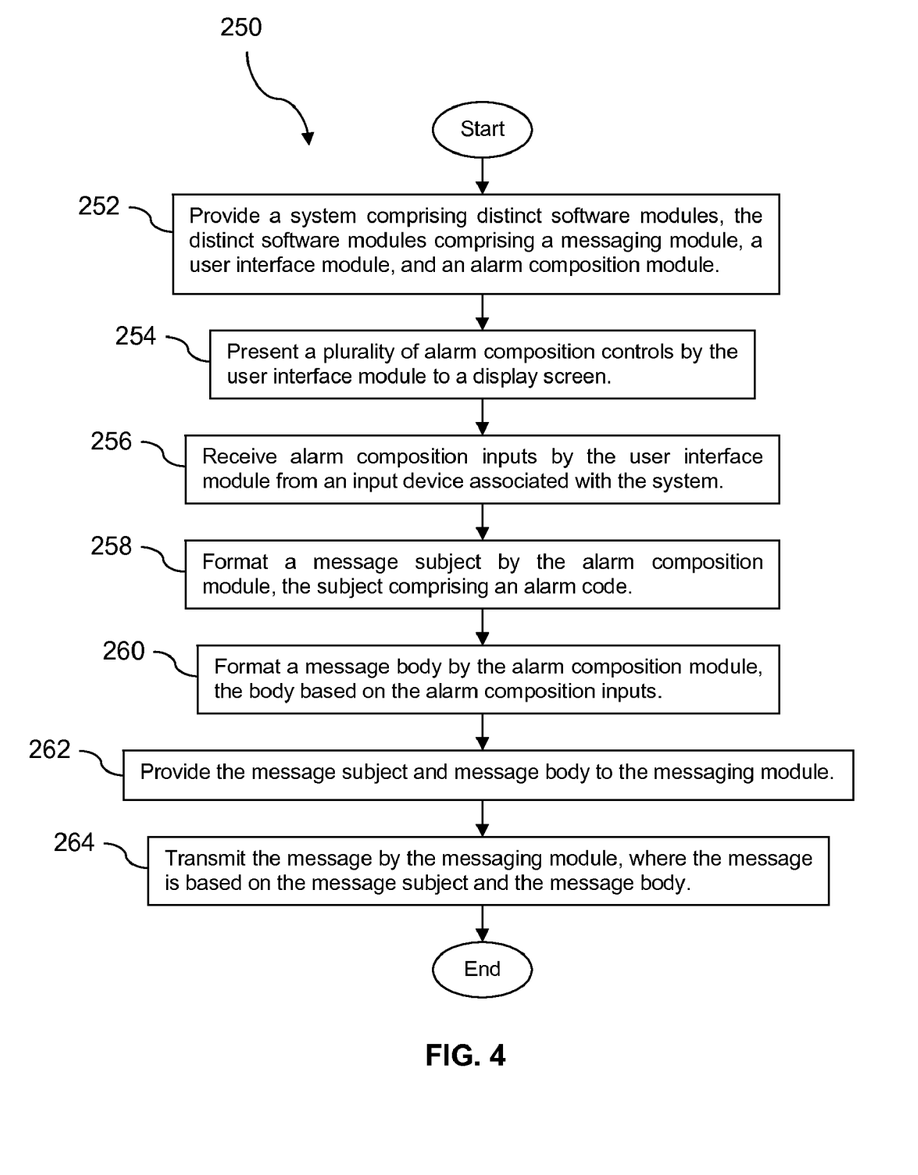
FIG. 4 is a flow chart of another method according to an embodiment of the disclosure.

Turning now to FIG. 4, a method 250 is described. At block 252, a system comprising software modules is provided. In an embodiment, the software modules may comprise a messaging module, a user interface module, and an alarm composition module. In an embodiment, one or more of the software modules may be combined in one module. Alternatively, in an embodiment, the messaging functionality may be provided by two or more modules; the user interface functionality may be provided by two or more modules; and/or the alarm composition functionality may be provided by two or more modules.

In block 254, a plurality of alarm composition controls are presented by the user interface module to a display screen. In block 256, alarm composition inputs are received by the user interface module, for example from an input device associated with the system. In block 258, a message subject comprising an alarm code is formatted by the alarm composition module. The alarm code may be a sequence of alpha-numeric characters or a sequence of bytes representing alpha-numeric characters that are associated with alarm communications. In some contexts, the alarm code may be referred to as an authentication code or as an alarm authentication code. In an embodiment, the alarm code may comprise a sequence of five alpha-numeric characters. In another embodiment, the alarm code may comprise a sequence of six alpha-numeric characters. In another embodiment, the alarm code may comprise more than six alpha-numeric characters.

In block 260, a message body is formatted by the alarm composition module. The message body may be based on alarm composition inputs received by the user interface module in block 256. In block 262, the message subject and message body are provided to the messaging module. At block 264, the message—comprising the message subject and the message body—is transmitted by the messaging module.

Figure 5:
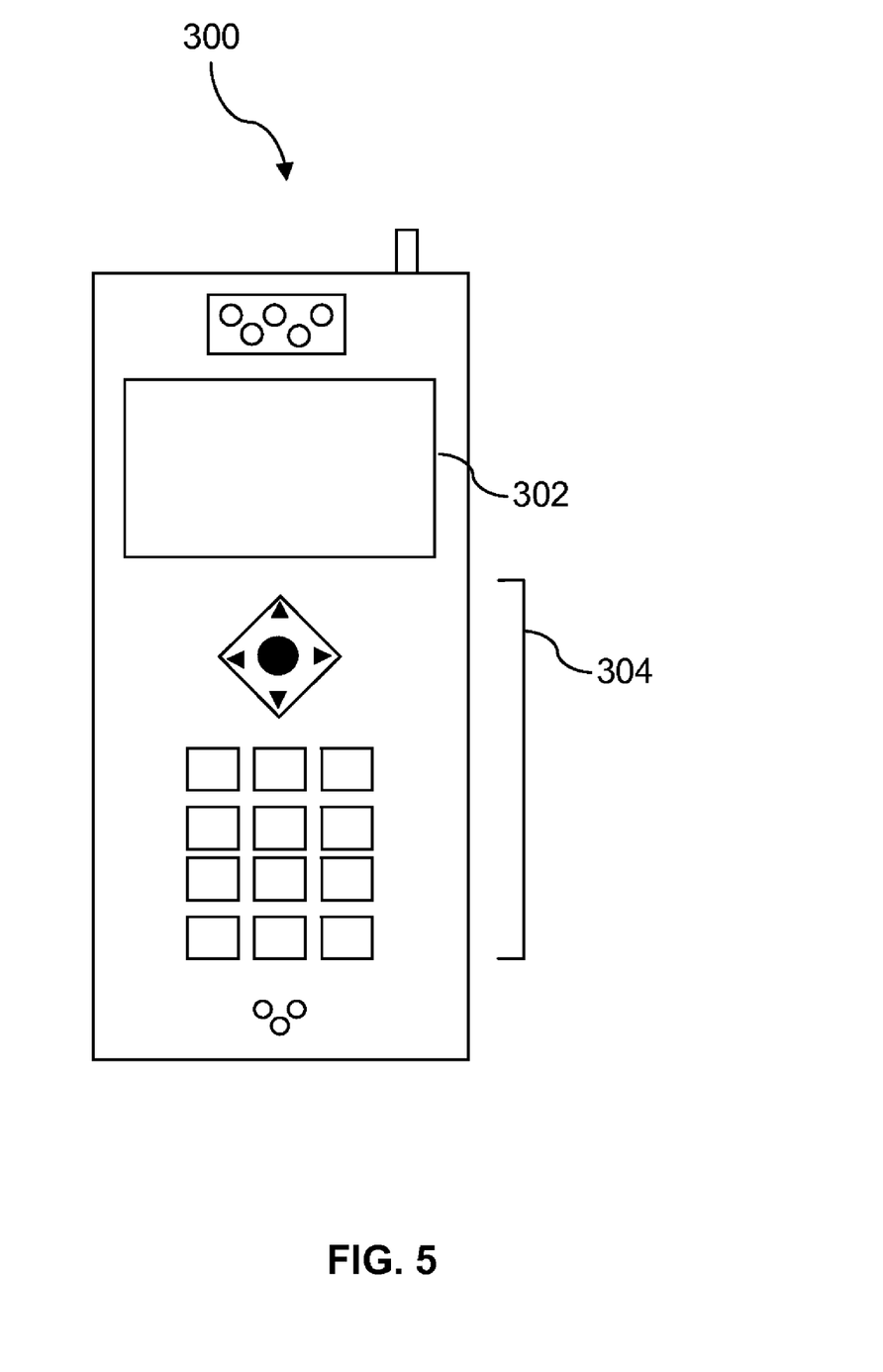
FIG. 5 is an illustration of an exemplary handset interface according to an embodiment of the disclosure.

FIG. 5 shows a wireless handset 300. In some embodiments, the electronic device 106 may take a form similar to the wireless handset 300, but the present disclosure should not be limited to these implementations. Though illustrated as a mobile phone, the handset 300 may take various forms including a wireless handset, a pager, a personal digital assistant (PDA), a gaming device, an inventory control device, a media player, a digital camera, a digital calculator, and/or other. Many suitable handsets combine some or all of these functions. In some embodiments of the present disclosure, the handset 300 may be a special-purpose communications device such as a mobile phone, wireless handset, pager, or PDA. The handset 300 may support specialized activities such as gaming, inventory control, job control, projection of information on a screen and/or wall, and/or task management functions, and so on.

The handset 300 includes a display 302 and a touch-sensitive surface or keys 304 for input by a user. The handset 300 may present options for the user to select, controls for the user to actuate, and/or cursors or other indicators for the user to direct. The handset 300 may further accept data entry from the user, including numbers to dial or various parameter values for configuring the operation of the handset. The handset 300 may further execute one or more software or firmware applications in response to user commands. These applications may configure the handset 300 to perform various customized functions in response to user interaction. Additionally, the handset 300 may be programmed and/or configured over-the-air, for example from the base transceiver station 112, a wireless access point, or a peer handset 300.

Figure 6:
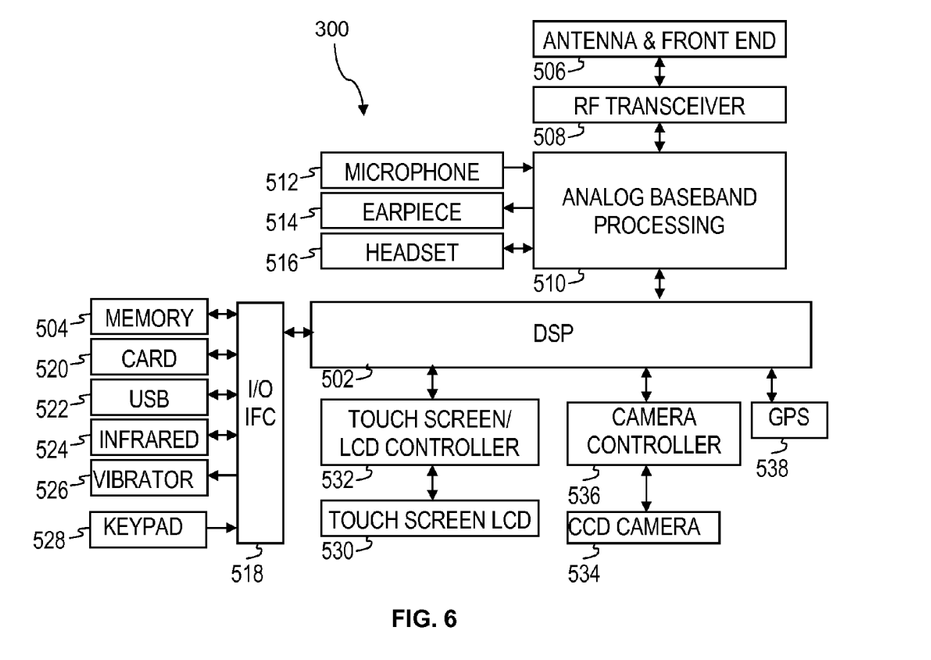
FIG. 6 is a block diagram of a handset according to an embodiment of the disclosure.

FIG. 6 shows a block diagram of the handset 300. While a variety of known components of handsets 300 are depicted, in an embodiment a subset of the listed components and/or additional components not listed may be included in the handset 300. The handset 300 includes a digital signal processor (DSP) 502 and a memory 504. As shown, the handset 300 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 300 may comprise a speaker, loudspeaker, or other aural alerting device for sounding an alarm. In an embodiment, the handset 300 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 300 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 300 to send and receive information from a radio access network (RAN) or some other available wireless communications network or from a peer handset 300. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 300 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 300 to function as a peripheral device to exchange information with a personal computer or other computer system. The infrared port 524 and other optional ports such as a Bluetooth interface or an IEEE 802.11 compliant wireless interface may enable the handset 300 to communicate wirelessly with other nearby handsets and/or wireless base stations.

The input/output interface 518 may further connect the DSP 502 to the vibrator 526 that, when triggered, causes the handset 300 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 300. Another input mechanism may be the touch screen LCD 530, which may also display text and/or graphics to the user. The touch screen LCD controller 532 couples the DSP 502 to the touch screen LCD 530.

The CCD camera 534 enables the handset 300 to take digital pictures. The DSP 502 communicates with the CCD camera 534 via the camera controller 536. The GPS sensor 538 is coupled to the DSP 502 to decode global positioning system signals, thereby enabling the handset 300 to determine its position. In another embodiment, a camera operating according to a technology other than charge coupled device cameras may be employed. Various other peripherals may also be included to provide additional functions, e.g., radio and television reception.

Figure 7:
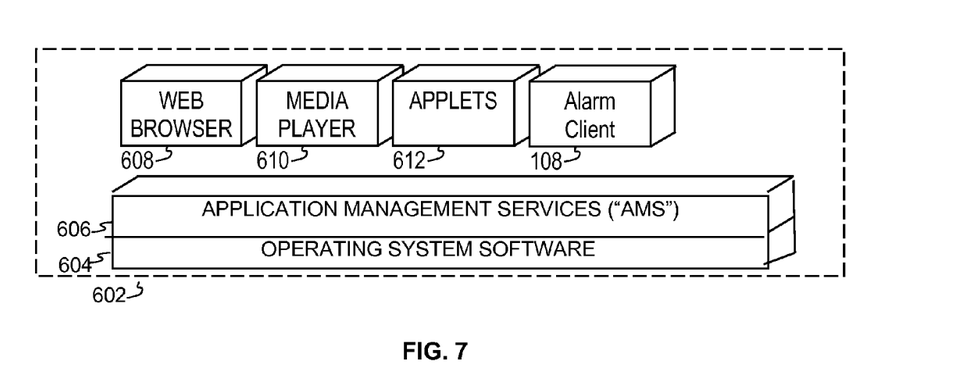
FIG. 7 is a block diagram of a software architecture of a handset according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 300. Also shown in FIG. 7 are a web browser application 608, a media player application 610, JAVA applets 612, and the alarm client 108. The web browser application 608 configures the handset 300 to operate as a web browser, allowing a user to enter information into forms and select links to retrieve and view web pages. The media player application 610 configures the handset 300 to retrieve and play audio or audiovisual media. The JAVA applets 612 configure the handset 300 to provide games, utilities, and other functionality. The alarm client 108 is described above with reference to FIG. 1.

Figure 8:
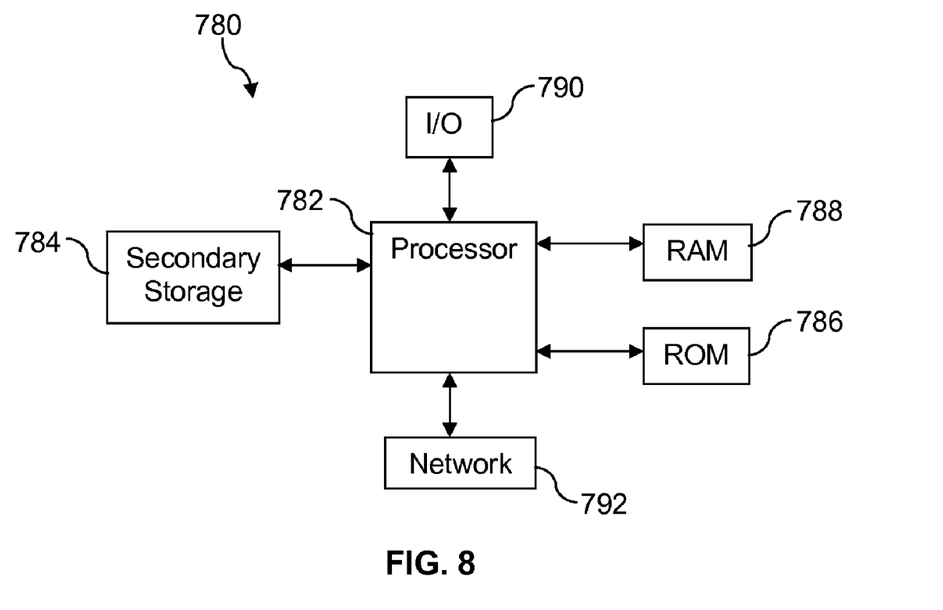
FIG. 8 illustrates an exemplary computer system suitable for implementing some aspects of an embodiment of the disclosure.

Some aspects of the system described above may be implemented on a computer with sufficient processing power, memory resources, and network throughput capability to handle the necessary workload placed upon it. FIG. 8 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The I/O devices 790 may further comprise speakers, loud-speakers, and other aural alerting devices for sounding an alarm.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An alarm device, comprising:
    a processor;
    an alerting component;
    a communication interface to receive messages, the message encapsulating an alarm control message from a third party; and
    an alarm application that, when executed by the processor, receives the message from the communication interface, validates the message based on a code embedded in the message, parses a body of the message to extract the encapsulated alarm control message, one of schedules and turns off an alarm event based on the body of the message, and activates the alerting component at the scheduled time when the alarm event occurs.

2. The alarm device of claim 1, wherein the communication interface is a wireless interface.

3. The alarm device of claim 1, wherein the processor, the alerting component, and the communication interface are contained in a mobile electronic device.

4. The alarm device of claim 3, wherein the mobile electronic device is one of a mobile phone, a personal digital assistant, a laptop computer, a tablet computer, a wristwatch, and a media player.

5. The alarm device of claim 1, wherein the alerting component emits at least one of an audible alert and a visual alert when the alarm event occurs.

6. The alarm device of claim 1, wherein the encapsulated alarm control message comprises a plurality of information components and the alarm device further comprising an interface, the interface adapted to receive an input to select one of the information components for presentation and to present the selected information component.

7. The alarm device of claim 1, wherein the encapsulated alarm control message comprises a plurality of information components comprising at least one of an alarm activation time, an alarm on-off state, a designation of a work location, an author of the alarm control message, a time the alarm control message was authored, and a time the alarm control message was transmitted.

8. A computer based method of setting an alarm by a third party, comprising:
   receiving, by a computer, input defining an alarm event;
   formatting, by the computer, a message comprising a subject and a body, the subject embedding an authentication code, the body encapsulating information about the alarm event; and
   transmitting the message to a first alarm device, wherein the first alarm device is adapted to generate an alarm at a time based on specified in the message, wherein the alarm event is associated with a work schedule.

9. The method of claim 8, wherein the authentication code comprises a string of at least six characters.

10. The method of claim 8, wherein the alarm event is associated with one of a food service work schedule, a healthcare worker work schedule, a law enforcement worker work schedule, a communication services work schedule, and an emergency responder work schedule.

11. The method of claim 8, wherein the message is a short messaging service message.

12. The method of claim 8, further including receiving, by the computer, input defining the first alarm device and a second alarm device and further including transmitting the message to the second alarm device, wherein the second alarm device is adapted to generate an alert at a time based on the message.

13. The method of claim 8, wherein the input defining the alarm event comprises a work schedule and further comprising analyzing the work schedule, an expected worker preparation time, and an expected worker commute time to determine the time for the alarm device to generate the alert.

14. The method of claim 8, wherein the information about the alarm event comprises at least one of an author defining the alarm event, a time the alarm event was created, and an alarm on-off state.

15. The method of claim 8, wherein transmitting the message to the alarm device comprises transmitting the message over a wireless link.

16. The method of claim 8, wherein the message causes the alarm device to generate an alert at a time later than a time defined in a previously transmitted message.

17. A computer program product, comprising a computer usable medium having a computer readable program code embodied therein, the computer readable program code adapted to be executed to implement a method for setting an alarm by a third party, the method comprising:
   providing a system, wherein the system comprises software modules, and wherein the software modules comprise a messaging module, a user interface module, and an alarm composition module;
   presenting a plurality of alarm composition controls to a display screen by the user interface module, wherein the alarm composition controls comprise a time of alarm activation;
   receiving alarm composition inputs from an input device by the user interface module;
   formatting a message subject comprising an authentication code by the alarm composition module;
   formatting a message body based on the alarm composition inputs by the alarm composition module;
   providing the message subject and the message body to the messaging module; and
   transmitting a message by the messaging module based on the message body and the message subject.

18. The computer program product of claim 17, wherein the authentication code is automatically determined by the alarm composition module based on an identification of a receiver of the message.

19. The computer program product of claim 17, wherein the alarm composition controls further comprise at least one of an identification of a receiver of the message, a phone number of a receiver of the message, an identification of a user of the system, a time of composition of the message, a report-to location, and an on/off alarm state.

20. The computer program product of claim 19, wherein the identification of a receiver of the message is one of an individual receiver of the message and a group of receivers of the message, and when a group of receivers of the message is identified, the alarm composition module automatically formats messages directed to each member of the group of receivers.

* * * * *